(12) United States Patent
Fish

(10) Patent No.: US 6,860,638 B2
(45) Date of Patent: Mar. 1, 2005

(54) SPHERICAL BEARING

(75) Inventor: Elson B. Fish, Lakeville, IN (US)

(73) Assignee: Polygon Company, Inc., Walkerton, IN (US)

( * ) Notice: Subject to any disclaimer, the term of this patent is extended or adjusted under 35 U.S.C. 154(b) by 58 days.

(21) Appl. No.: 10/376,715

(22) Filed: Feb. 28, 2003

(65) Prior Publication Data
US 2004/0022465 A1 Feb. 5, 2004

Related U.S. Application Data
(60) Provisional application No. 60/361,578, filed on Mar. 4, 2002.

(51) Int. Cl.$^7$ ............................ F16C 33/20; F16C 23/04
(52) U.S. Cl. ...................... 384/300; 384/192; 384/206; 384/213
(58) Field of Search ................................ 384/300, 298, 384/192, 206, 202, 203, 213

(56) References Cited

U.S. PATENT DOCUMENTS

| | | | |
|---|---|---|---|
| 3,250,554 A | * 5/1966 | Roode | 403/139 |
| 3,266,123 A | * 8/1966 | McCloskey | 29/898.047 |
| 3,582,166 A | 6/1972 | Reising et al. | |
| 3,685,878 A | 8/1972 | Orkin | |
| 3,882,030 A | 5/1975 | Campbell et al. | 252/12 |
| 4,123,122 A | 10/1978 | Gabrielson et al. | |
| 4,358,167 A | 11/1982 | Magazian et al. | |
| 4,867,889 A | 9/1989 | Jacobson | 252/12.6 |
| 6,004,037 A | * 12/1999 | Harris et al. | 384/206 |
| 6,132,866 A | 10/2000 | Nelson et al. | 428/359 |
| 6,139,261 A | * 10/2000 | Bishop et al. | 415/148 |
| 6,203,207 B1 | 3/2001 | Yamamoto et al. | 384/492 |

* cited by examiner

Primary Examiner—Thomas R. Hannon
(74) Attorney, Agent, or Firm—Taylor & Aust, P.C.

(57) ABSTRACT

A spherical bearing including a generally annular first portion having at least a partial substantially spherical outer surface and a generally annular second portion having at least a partial substantially concave surface, the outer surface at least partially engaging the concave surface, at least one of the outer surface and the concave surface having a plurality of frayed polytetraflouroethylene fibers exposed therefrom.

12 Claims, 3 Drawing Sheets

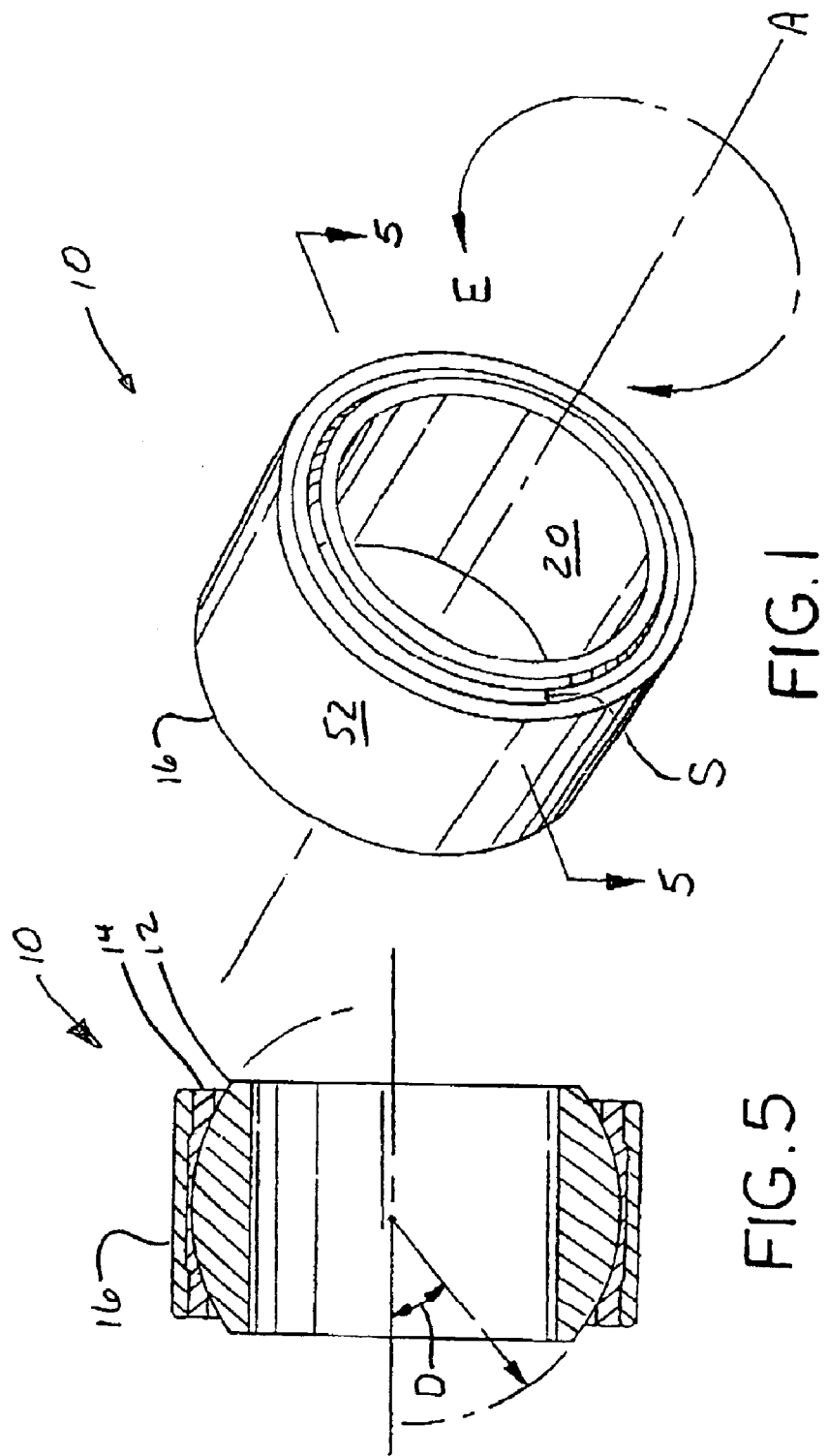

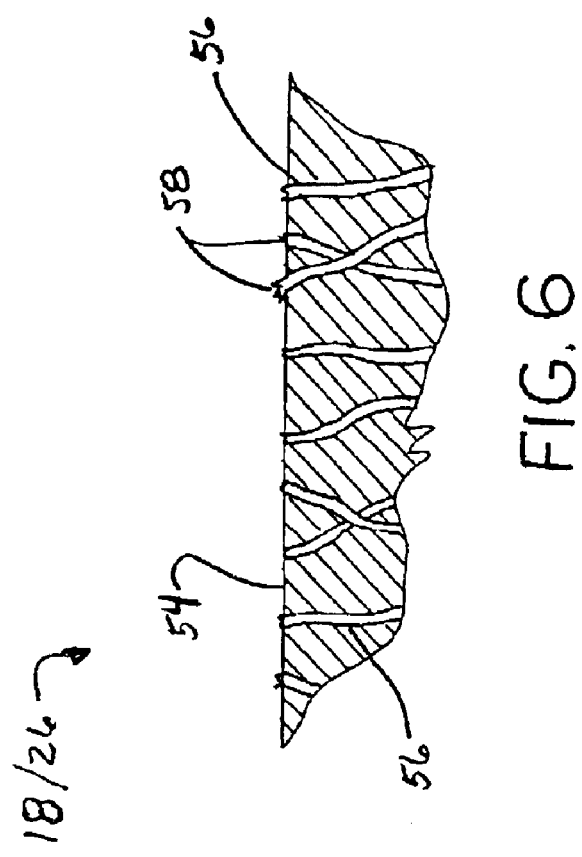

SPHERICAL BEARING

This application claims the benefit of provisional application No. 60/361,578, filed Mar. 4, 2002.

BACKGROUND OF THE INVENTION

1. Field of the Invention

The present invention relates to a spherical bearing, and, more particularly, to a composite spherical bearing.

2. Description of the Related Art

Spherical and semi-spherical bearings are known. A typical spherical bearing may include an inner partially spherical bearing with a surface that interacts with a substantially spherical concave outer retaining portion. The retaining portion may be connected to a linkage or similar mechanical device. A shaft is often attached to the inner spherical portion or is integral with the inner spherical portion such as a tie rod end on a vehicle.

Spherical bearings have spherical contact surfaces which allow the inner ring to rotate freely with multiple degrees of freedom while positioned within the bearing outer retaining portion. The multiple degrees of freedom allows a spherical bearing the ability to self-align such that it automatically adjusts to any misalignment, which may occur due to application requirements, machining tolerances, welding distortions or mounting deformations due to static and dynamic forces. Machining and distortion misalignment difficulties normally generate considerable end loading and cause the early failure of conventional cylindrical sleeve bearings. Spherical bearings are devised for the purpose of accommodating application, manufacturing and distortion misalignment for which sleeve bearings are not capable or are inadequate.

What is needed in the art is a spherical bearing, which provides for an easy and reliable manufacture of the bearing parts in a time efficient manner, and which doesn't require an addition of a lubrication film.

SUMMARY OF THE INVENTION

The present invention provides a spherical bearing which is self lubricating and has a surface with a self healing characteristic.

The invention comprises, in one form thereof, a spherical bearing including a generally annular first portion having at least a partial substantially spherical outer surface and a generally annular second portion having at least a partial substantially concave surface, the outer surface at least partially engaging the concave surface, at least one of the outer surface and the concave surface having a plurality of frayed polytetraflouroethylene fibers exposed therefrom.

An advantage of the present invention is that the elastic nature of the retaining surface allows the spherical bearing portion to be snapped into place.

Another advantage is that at least one of the surfaces of the bearing interface is self lubricating.

Yet another advantage is that the bearing surface has a self-healing characteristic.

A further advantage of the present invention is that the lubricating film if removed replenishes itself from the surrounding material.

A still further advantage is that the present invention provides a dampening characteristic to shock or impact loads due to the elastic characteristics of the composite structure.

Another still further advantage is that the present invention is several times more elastic under radial load than metallic bearings, thereby providing a cushioning feature under shock load conditions.

And, yet another advantage is that the present invention provides a bearing that is reduced in weight as compared to a metallic bearing.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIG. 1 is a perspective view of a spherical bearing assembly illustrating an embodiment of the present invention;

FIG. 5 is a cross-sectional view along section line 5—5 of the assembled spherical bearing of FIG. 1; and FIG. 6 illustrates a bearing surface with frayed polytetraflouroethylene fibers exposed therefrom, the bearing surface included in the spherical bearing assembly of FIG. 1.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 4:
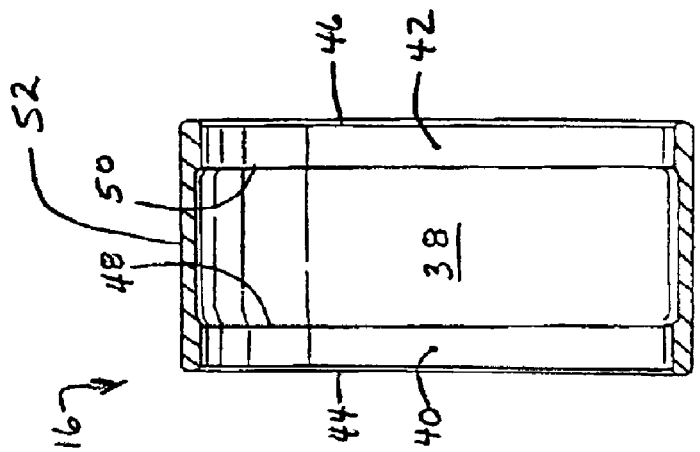
FIG. 4 is a cross-sectional view of the outer portion of the spherical bearing of FIG. 1.
Figure 3:
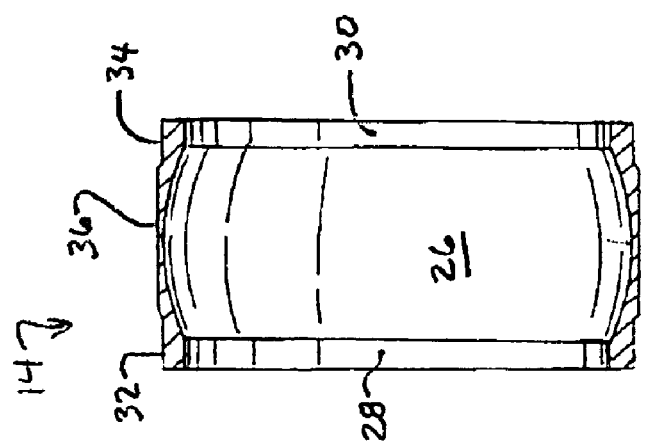
FIG. 3 is a cross-sectional view of an intermediate portion of the spherical bearing of FIG. 1.
Figure 2:
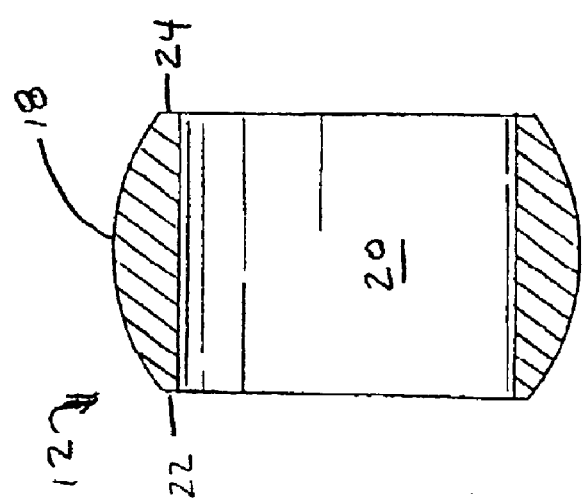
FIG. 2 is a cross-sectional view of an inner portion of the spherical bearing of FIG. 1.

Referring now to the drawings, and more particularly to FIGS. 1–5, there is shown a spherical bearing assembly 10 which generally includes a first bearing portion 12, a second bearing portion 14 and a third bearing portion 16.

First bearing portion 12, also known as spherical portion 12, includes a substantially convex spherical outer surface 18, a substantially cylindrical inner surface 20, a first shoulder 22 and a second shoulder 24. Spherical outer surface 18 is shaped to interface with intermediate portion 14. Outer surface 18 may be finished to a relatively smooth surface finish. Cylindrical inner surface 20 is sized to accommodate a shaft or fastening device to connect spherical portion 12 to another movable object (not shown). Alternatively, cylindrical inner surface 20 may be replaced with an integral protruding part to which a linking item may be connected (not shown). Shoulders 22 and 24 are provided to allow a fastening device to be secured thereagainst.

Second portion 14, also known as intermediate portion 14, includes concave inner surface 26, a first inner shoulder 28, a second inner shoulder 30, a first outer shoulder 32, a second outer shoulder 34 and an outer locking surface 36. Concave inner surface 26 is generally shaped to accommodate convex spherical outer surface 18 of spherical portion 12. Concave inner surface 26 may have a diameter which is either the substantially the same as or in slight variance with the spherical diameter of outer surface 18. Inner shoulders 28 and 30 are sized to allow spherical outer surface 18 of spherical portion 12 to be pressed against either inner shoulder 28 or 30. The flexible nature of intermediate portion 14 allows spherical portion 12 to be inserted into intermediate portion 14 by the expansion of inner shoulder diameter 28 or 30. Alternatively, if spherical portion 12 is made of a deformable resilient material, then both intermediate portion 14 and spherical portion 12 may flex in a co-acting manner, thereby allowing spherical portion 12 to be inserted into intermediate portion 14. Outer shoulders 32 and 34 along with outer locking surface 36 are sized and shaped to accommodate locking features of outer portion 16. Alternatively, intermediate portion 14 may have differing external features, which allow the direct connection of intermediate portion 14 to a mounting object (not shown). Such an arrangement allows portion 14 and spherical portion 12 to be the entire spherical bearing without the need for outer portion 16. In addition, intermediate portion 14 may have a split S that extends from one side to the other, thereby allowing intermediate portion 14 to expand around spherical portion 12.

Third bearing portion 16, otherwise known as outer portion 16, includes inner locking surface 38, a first locking protrusion 40, a second locking protrusion 42, a first insertion aid 44, a second insertion aid 46, a first angled surface 48, a second angled surface 50 and an interface surface 52. The resilient nature of intermediate portion 14 allows a slight deformation thereof upon insertion into outer portion 16. Inner locking surface 38 interacts with outer locking surface 36 as intermediate portion 14 is pressed into outer portion 16. Locking protrusions 40 and 42 serve to prevent lateral movement of intermediate portion 14 once it is inserted into outer portion 16. Insertion aids 44 and 46 are angled surfaces that allow the directing of and compression of outer locking surface 36 as it is inserted into outer portion 16. Angled surfaces 48 and 50 are shaped to retain intermediate portion 14 within outer portion 16. Inner locking surface 38 may be sized to accommodate the outer diameter of outer locking surface 36 or may be sized to have a slight interference fit to prevent the rotation of intermediate portion 14 within outer portion 16. Interface surface 52 has been shown as generally cylindrical in nature. However, interface surface 52 may have tabs, mounting protrusions or other integral features to allow the connection of outer portion 16 to other mechanical devices.

The assembly of spherical bearing assembly 10 is accomplished by inserting spherical portion 12 into intermediate portion 14 then inserting the resulting subassembly into outer portion 16. The assembly process may require a press operation in order to take advantage of the resiliency of spherical portion 12, intermediate portion 14 and outer portion 16. Once assembled, spherical portion 12 may rotate in direction D as shown in FIG. 5 to accommodate misalignment between an object connected to interface surface 52 and a shaft or connecting device going through cylindrical inner surface 20. Spherical portion 12 may also rotate in direction E about axis A as shown in FIG. 1. Alternatively, an initial application of a film of PTFE powder, such as Whitcon TL-171, onto spherical portion 12 and/or intermediate portion 14 before assembly will assist in reducing friction, particularly during an initial break-in period.

Now, additionally referring to FIG. 6, spherical portion 12, intermediate portion 14 and/or outer portion 16 are made of a composite material that may include polytetraflouroethylene (PTFE) fibers, polyester and glass fibers. Whereas the needed resiliency of spherical portion 12, intermediate portion 14 and outer portion 16 may differ, the composition of each are varied to meet the intended use. In use the PTFE and polyester migrate under pressure to concave inner surface 26 and/or convex spherical outer surface 18 thereby forming a self-lubricating film between the co-engaged surfaces. Spherical outer surface 18 and/or concave inner surface 26 have ends of fibers protruding from the composite material, which are frayed. The machining of convex spherical outer surface 18 and/or concave inner surface 26 tends to fibrillate the ends of the PTFE fibers leaving them frayed, which is instrumental in the formation of the self-lubricating film to the extent observed. Alternatively, spherical portion 12 and/or outer portion 16 may be made of metal such as 4140 steel instead of composite materials.

Spherical portion 12 may be formed primarily of fiberglass which has a substantial hardness. Spherical portion 12 made of glass fibers has a hardness of approximately Rockwell 48C and the surface finish may range from 60 Ra to 100 Ra. The fiberglass is contained in an epoxy matrix and it is the combination of materials and surface finish that provides a superior surface, as compared to metallic spheres, for accepting a lubricant film formed of materials from intermediate portion 14. Intermediate portion 14 includes approximately 10% PTFE fiber, 12% polyester fiber and 60% fiberglass filament wound at an angle to the rotation angle. The angle, for example, may be, but not limited to, ±45° to thereby enhance shear and overall strength properties. These materials are encapsulated in an epoxy matrix.

Frayed PTFE fibers have the ability to deposit a lubricating film on the interface between spherical outer surface 18 and concave inner surface 26. In addition, there is a self-healing characteristic in this arrangement in that the lubricant film on the surface has the ability to reform, if the prior film is wiped, worn or abraded off of a surface. It is the combination of composite materials that advantageously aids in the ability to transfer a lubricant film to the surfaces of spherical outer surface 18 and concave inner surface 26. This ability to transfer a lubricant film to a steel or chromed spherical surface, of bearings currently available, has not been observed and these surfaces likewise do not indicate signs of healing when lubricating films from those surfaces are removed.

FIG. 6 illustrates a magnified cross-sectional view of a finished surface 54 of spherical outer surface 18 and/or concave inner surface 26 with PTFE fibers 56 protruding therethrough. The ends of PTFE fibers 56 are frayed at 58 due to the orientation of the PTFE fibers and the machining of surface 54.

Alternatively, spherical portion 12 and/or intermediate portion 14 may be of layered construction with the advantageous self-lubricating properties primarily located on spherical outer surface 18 and/or concave inner surface 26. Further, spherical portion 12 and/or intermediate portion 14 may be of a gradient construct. The gradient construction being such that the composite part may have a non-uniform composition with the advantageous self-lubricating properties primarily concentrated on spherical outer surface 18 and/or concave inner surface 26.

The present invention advantageously, is completely nonmetallic, having high strength and is self-lubricating. Also, the present invention provides a dampening characteristic to shock or impact loads due to the elastic characteristics of the composite structure. Tests have shown that the bearing of the present invention is approximately 15 times more elastic under radial load than metallic bearings, thereby providing a cushioning feature under shock load conditions. Further, the elastic properties of the spherical bearing provide acoustical dampening, thereby reducing the transmission of acoustical energy to devices connected thereto.

A key issue with the load capacity of bearings is not how much load a bearing will carry, but how well it performs under load. While a steel spherical bearing can carry a tremendous load, the friction of a steel spherical bearing is considerably higher than the spherical bearing of the present invention particularly if the lubricating film is wiped off during use.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A spherical bearing, comprising:
   a generally annular first portion having at least a partial substantially spherical outer surface; and
   a generally annular second portion having at least a partial substantially concave surface, said concave surface at least partially engaging said outer surface, at least one of said outer surface and said concave surface having a plurality of frayed polytetraflouroethylene fibers exposed therefrom.

2. The spherical bearing of claim 1, wherein said second portion is elastically expanded over said first portion.

3. The spherical bearing of claim 2, further comprising a third portion lockingly engaging said second portion therein.

4. The spherical bearing of claim 1, wherein said second portion has at least one split configured to separate thereby allowing the insertion of said first portion into said second portion.

5. The spherical bearing of claim 4, further comprising a third portion for locking engagement of said second portion therein, thereby retaining said first portion in said second portion.

6. The spherical bearing of claim 1, wherein at least one of said first portion and said second portion is composed of a material that additionally includes polyester, at least one fiberglass filament and epoxy.

7. The spherical bearing of claim 6, wherein the spherical bearing has a rotational direction, at least one said fiberglass filament being wound at an angle to said rotational direction.

8. A bearing assembly, comprising:
   a generally annular first bearing portion;
   a generally annular second bearing portion, said second bearing portion having said first bearing portion at least partially inserted therein; and
   a third bearing portion retainingly positioned around at least a portion of said second bearing portion, at least one of said first bearing portion and said second bearing portion having a surface with a plurality of frayed polytetraflouroethylene fibers exposed thereon.

9. The assembly of claim 8, wherein said first bearing portion and said second bearing portion each have a surface with a plurality of said frayed polytetraflouroethylene fibers exposed therefrom.

10. The assembly of claim 9, wherein at least a portion of said surface of said first bearing portion is in sliding contact with at least a portion of said surface of said second bearing portion.

11. The assembly of claim 8, wherein said first bearing portion, said second bearing portion and said third bearing portion are made of a nonmetallic composite material.

12. The assembly of claim 11, wherein said composite material includes polytetraflouroethylene fibers, polyester, glass fibers and epoxy.

* * * * *